US010235368B2

(12) United States Patent
Hsiao et al.

(10) Patent No.: US 10,235,368 B2
(45) Date of Patent: *Mar. 19, 2019

(54) SYSTEM AND METHOD FOR UPDATING EXTERNAL FILE REFERENCED BY DATABASE WITH TRANSACTIONAL CONSISTENCY USING SQL

(75) Inventors: Hui-I Hsiao, Saratoga, CA (US); Joshua Wai-Ho Hui, San Jose, CA (US); Inderpal Singh Narang, Saratoga, CA (US)

(73) Assignee: International Business Machines Corporation, Armonk, NY (US)

(*) Notice: Subject to any disclaimer, the term of this patent is extended or adjusted under 35 U.S.C. 154(b) by 5110 days.

This patent is subject to a terminal disclaimer.

(21) Appl. No.: 10/135,982

(22) Filed: Apr. 30, 2002

(65) Prior Publication Data
US 2002/0174103 A1 Nov. 21, 2002

Related U.S. Application Data

(63) Continuation-in-part of application No. 09/590,637, filed on Jun. 8, 2000, now Pat. No. 6,553,391.

(51) Int. Cl.
*G06F 17/30* (2006.01)
(52) U.S. Cl.
CPC .............. *G06F 17/30067* (2013.01)
(58) Field of Classification Search
USPC ............... 707/1–10, 102–104, 200–204
See application file for complete search history.

(56) References Cited

U.S. PATENT DOCUMENTS

| | | | |
|---|---|---|---|
| 4,104,718 A | 8/1978 | Poublan et al. | 364/200 |
| 5,043,871 A | 8/1991 | Nishigaki et al. | 364/200 |
| 5,588,147 A | 12/1996 | Neeman et al. | 395/601 |
| 5,642,505 A * | 6/1997 | Fushimi | 707/204 |
| 5,721,915 A | 2/1998 | Sockut et al. | 395/616 |
| 5,757,669 A | 5/1998 | Christie et al. | 364/514.006 |
| 5,761,677 A * | 6/1998 | Senator et al. | 707/203 |
| 5,819,272 A | 10/1998 | Benson | 707/8 |
| 5,878,434 A * | 3/1999 | Draper et al. | 707/202 |
| 5,924,094 A | 7/1999 | Sutter | 707/10 |

(Continued)

OTHER PUBLICATIONS

Navarro, Gonzalo, Searching in Metic Spaces by Spatial Approximation:, Sep. 22-24, 1999, p. 97-104, String Processing and Information Retrieval Symposium, 1999 and International Workshop on Groupware.

(Continued)

*Primary Examiner* — Ashish Thomas
*Assistant Examiner* — Mellissa M. Ohba
(74) *Attorney, Agent, or Firm* — Rogitz & Associates

(57) ABSTRACT

A system and method for updating files in a file system that is linked to a database system which stores metadata pertaining to the files. Changes intended to be made to an original file are written to a replacement file, and when the user is ready to move the changes onto the original file, a database transaction is commenced. If the transaction commits, the replacement file is renamed to the original file and the file security attributes of the original file are applied. Otherwise, the rename operation does not take place, thereby ensuring consistency between the metadata in the dbms system and the file system data that is represented by the metadata.

66 Claims, 6 Drawing Sheets

(56) References Cited

U.S. PATENT DOCUMENTS

| | | | |
|---|---|---|---|
| 5,963,940 A | 10/1999 | Liddy et al. ...................... 707/5 |
| 5,983,217 A | 11/1999 | Khosravi-Sichani et al. .... 707/3 |
| 5,995,980 A * | 11/1999 | Olson et al. .................. 707/201 |
| 6,029,160 A | 2/2000 | Cabrera et al. .................... 707/1 |
| 6,088,694 A * | 7/2000 | Burns et al. |
| 6,185,663 B1 * | 2/2001 | Burke ........................... 711/156 |
| 6,453,325 B1 * | 9/2002 | Cabrera et al. |
| 6,549,916 B1 * | 4/2003 | Sedlar |
| 6,564,215 B1 | 5/2003 | Hsiao et al. ...................... 707/8 |
| 6,591,272 B1 * | 7/2003 | Williams ...................... 707/102 |
| 6,856,993 B1 * | 2/2005 | Verma et al. ................. 707/101 |

OTHER PUBLICATIONS

"Database Managed External File Update". Mittal and Hsiao. Proceedings of the 17th IEEE International Conference on Data Engineering (ICDE), pp. 557-565, Heidelberg, Germany, Apr. 2001.

* cited by examiner

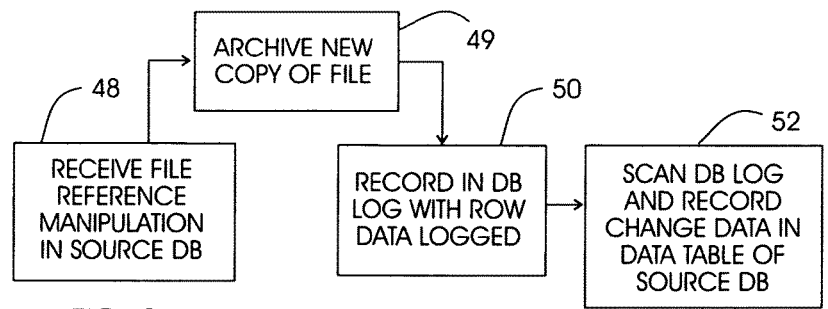
FIG. 2A
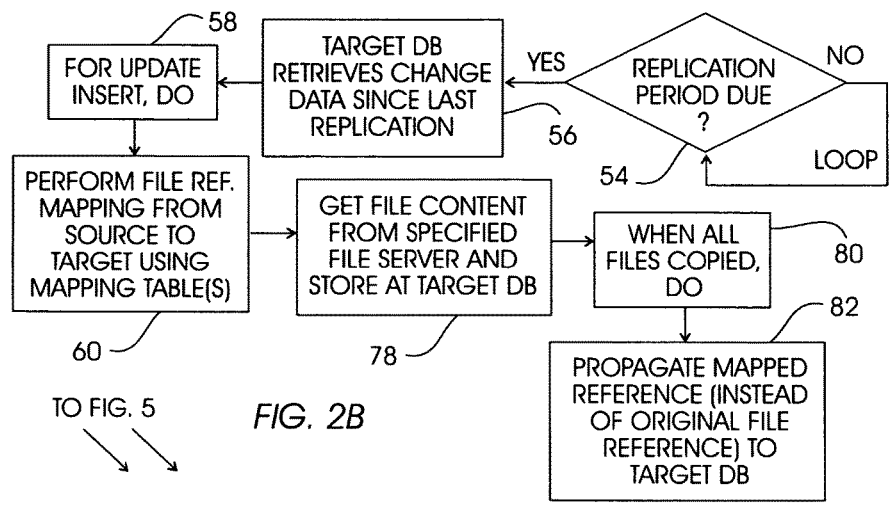
FIG. 2B
FIG. 3
SERVER M. T.
FIG. 4
FILE PREFIX M. T.

SQL OPERATION
LOGIC FLOW

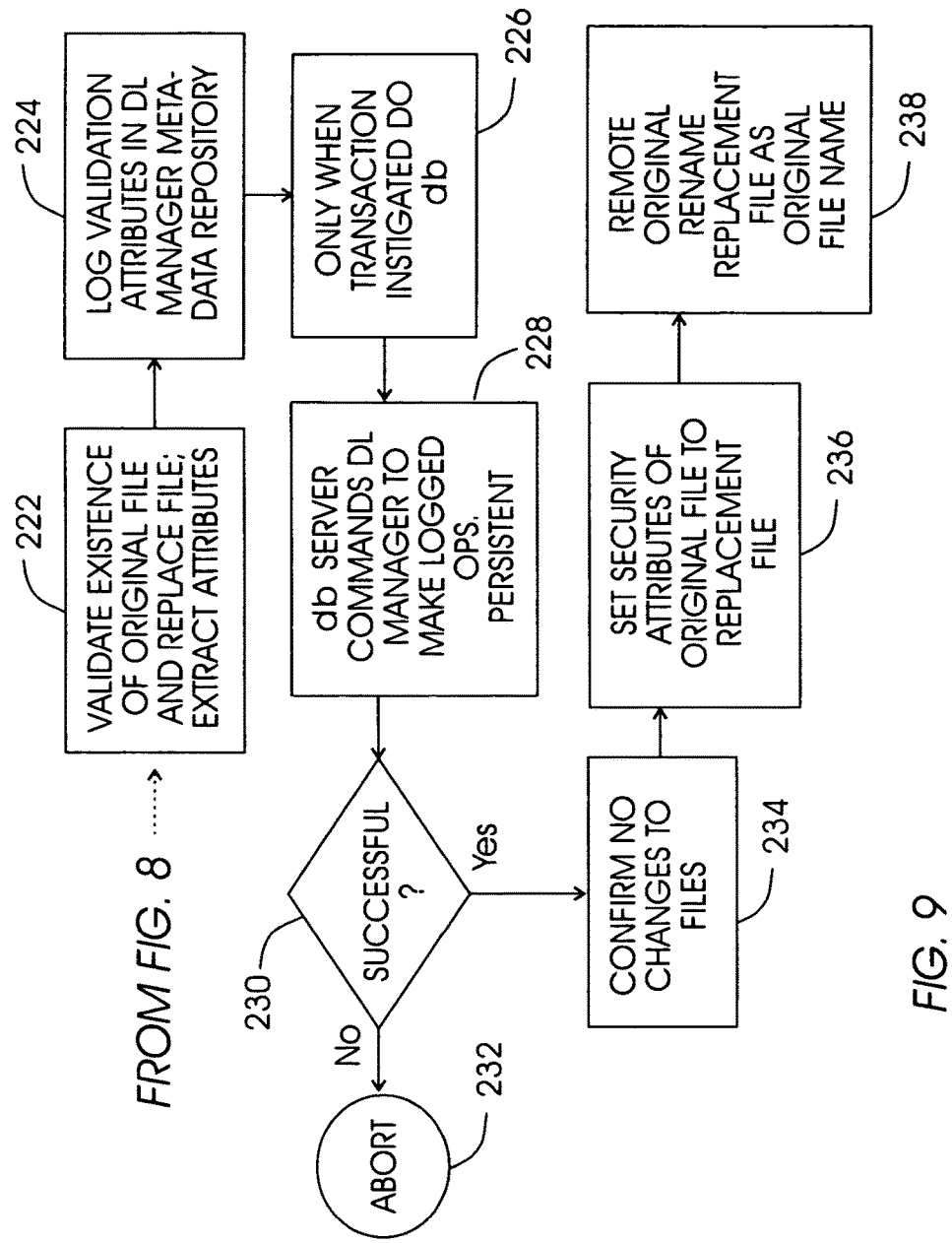

SYSTEM AND METHOD FOR UPDATING EXTERNAL FILE REFERENCED BY DATABASE WITH TRANSACTIONAL CONSISTENCY USING SQL

This application is a continuation-in-part of co-pending U.S. patent application Ser. No. 09/590,637, filed Jun. 8, 2000, entitled "SYSTEM AND METHOD FOR REPLICATING EXTERNAL FILES AND DATABASE METADATA PERTAINING THERETO", from which priority is claimed and which is incorporated herein by reference.

BACKGROUND OF THE INVENTION

1. Field of the Invention

The present invention relates generally to using a database management system (DBMS) to manage files that are external to the DBMS, and more particularly to updating external files using SQL to maintain transactional consistency.

2. Description of the Related Art

The present assignee's "DataLinks" component of its commercial relational database management system (DBMS) DB2 allows large objects such as text, graphics, audio, and video to be stored as files in file systems, with the metadata of the files being stored in the DBMS and with the files linked to the DBMS. In this way, management of file data in connection with the metadata and access control of the files advantageously is provided by the DBMS. "DataLinks" (also referred to herein as "DLink" or "DL") is the subject of U.S. Pat. No. 6,029,160, incorporated herein by reference.

In the parent application, it is recognized that in many current applications, particularly in e-commerce, so-called "extended enterprises" are becoming commonplace. In an extended enterprise, for security, performance, and availability reasons, each of, say, two partners has its own file system linked to its own respective DBMS for access control. An example of an extended enterprise might be an automotive manufacturer that has suppliers who collaborate on product designs.

The parent application further recognized that since each partner might be authorized to change, add, or delete a file, to ensure consistency the changes one partner makes to a file should be replicated into the other partner's file system and DBMS. Moreover, the parent application recognized that this reconciliation, which should occur on a relatively frequent basis, should include both file system data and metadata, which in turn requires that the replication occur in a systematic and synchronized way. Also, while some operations might require DBMS metadata replications, such as changes to references to a file that do not modify the file itself or updates to DBMS columns other than the column containing the file reference, file replication is not required. Accordingly, the parent application provided a method and system for the systematic, synchronized replication of files and corresponding DBMS metadata from a source system to a target system, and which preferably replicates only necessary file changes from the source to the target.

The present invention makes further observations with respect to file updates. More particularly, the present invention recognizes that in the DLink system, file metadata may be stored in and managed by a database system and the underlying files be stored in a file system that is separate from the database, and as a consequence it can be difficult to maintain consistency between files being updated in the file system and the corresponding metadata in the database. One current way to update a linked file is to unlink, modify, and relink the file to the DLink system, but since the file, while unlinked, in not under DLink control, it does not participate in any metadata search and it can be deleted or renamed by anyone with the requisite privileges, thereby creating an inconsistency between the metadata and the file system data it purports to represent. A second way to update a file is to make the update while the file remains linked to DLink control, but as recognized herein these changes are not performed in a transactional manner. Consequently, if a decision is made to roll back the database state to an earlier point in time as is sometimes the case, the changes to the file cannot be backed out, again creating asynchronization between the metadata and the underlying file data it purports to represent. This can be a significant problem particularly in collaborative ("grid") computing applications.

SUMMARY OF THE INVENTION

The invention includes a computer system for undertaking the inventive logic set forth herein. The invention can also be embodied in a computer program product that stores the present logic and that can be accessed by a processor to execute the logic. Also, the invention is a computer-implemented method that follows the logic disclosed below.

Accordingly, in one aspect a computer-implemented method is disclosed for ensuring consistency between metadata stored in a database system and files stored in a file system and represented by the metadata. The method includes writing changes to an original file to a replacement file, and then commencing a database transaction. If the transaction commits, the method designates, as the name of the replacement file, the name of the original file, and then the original file is removed from the file system. Otherwise, the replacement file is not renamed and the original file is not removed.

In a preferred implementation, if the transaction commits, security attributes of the original file are set as security attributes of the replacement file, prior to removing the original file.

As disclosed in greater detail below, the present method preferably is facilitated by an SQL interface. The SQL interface is executable in an SQL UPDATE statement or an SQL INSERT statement. The SQL interface provides a value that is inserted into a data structure in the database system that represents the metadata.

A server can be associated with the database system to send a message to a manager that is associated with the file system. The message can cause the manager to execute the designating and removing acts after the value is inserted into the data structure. Moreover, the manager validates the existence of the original and replacement files in response to the message, and extracts security attributes from the original file in response to the message. Still further, the manager, responsive to the server, can make logged operations pertaining to the original and replacement files persistent. In one non-limiting implementation the manager determines whether the logged operations have been successfully made persistent. If so, the manager sets security attributes of the replacement file to be security attributes of the original file, and then the manager renames the replacement file as summarized above.

In another aspect, a system includes a database system storing metadata and a file system storing files represented by the metadata. An SQL interface ensures that files in the file system are not updated except when a transaction reflecting corresponding changes in the metadata commits in the database system.

In still another aspect, a system is disclosed for maintaining metadata in a database system consistent with file data in a file system. The file data is represented by the metadata. The system includes an SQL interface that facilitates metadata and file updates in an atomic manner.

The details of the present invention, both as to its structure and operation, can best be understood in reference to the accompanying drawings, in which like reference numerals refer to like parts, and in which:

BRIEF DESCRIPTION OF THE DRAWINGS

FIG. 2A is a flow chart showing the overall replication logic in the source system;

FIG. 2B is a flow chart showing the overall replication logic in the target system;

FIG. 3 is a schematic rendering of the Server mapping table;

FIG. 4 is a schematic rendering of the File Prefix mapping table;

FIG. 9 is a flow chart showing the ensuing logic of the LINK_FILE operation.

DETAILED DESCRIPTION OF THE PREFERRED EMBODIMENTS

FIGS. 1-6 pertain to the parent disclosure, the descriptions of which are repeated here for convenience.

Figure 1:
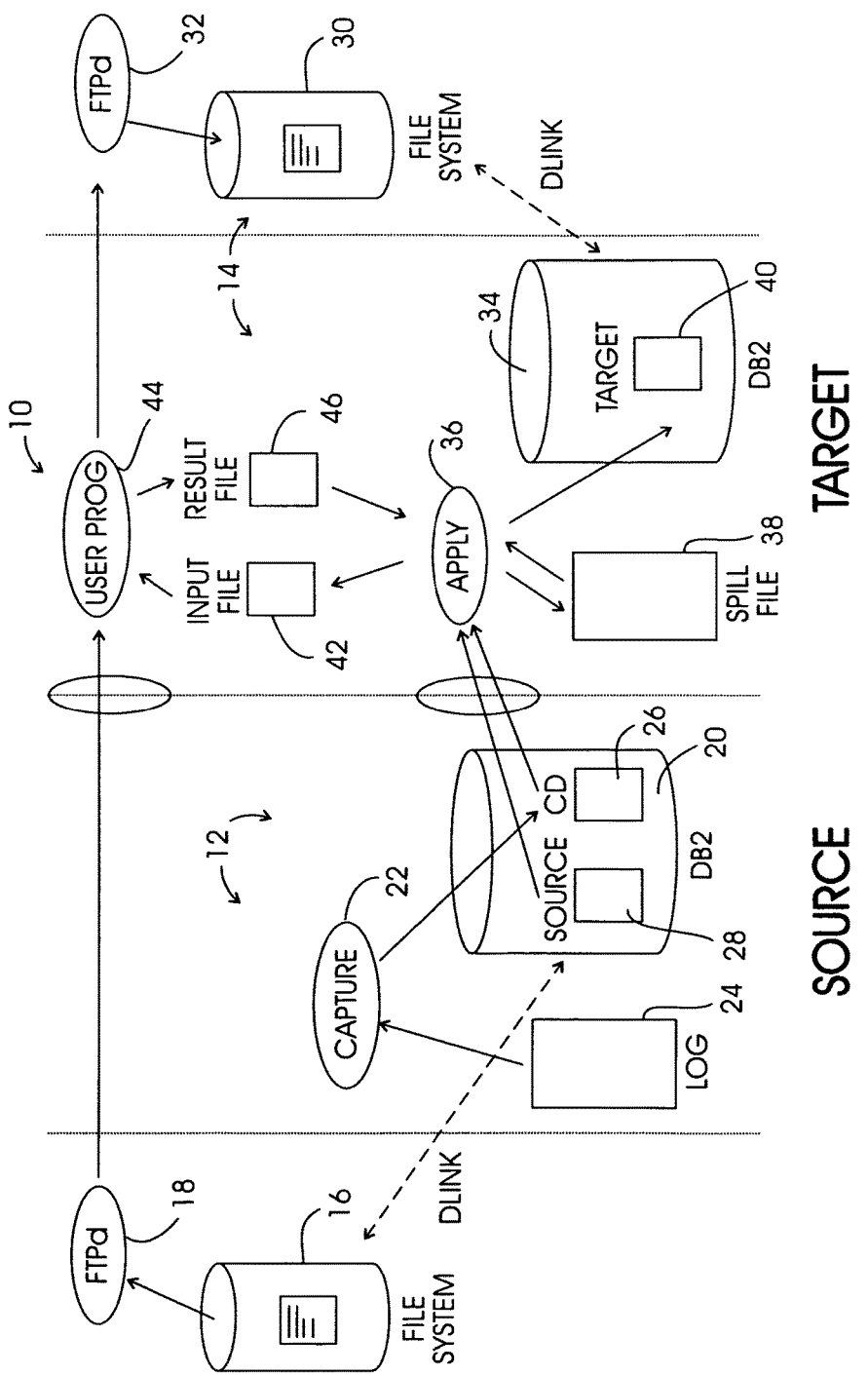
FIG. 1 is a block diagram of the architecture of the parent system.

Referring initially to FIG. 1, a computer system 10 is shown that includes a source system 12 and a target system 14. While a single source system and target system are shown, the principles advanced herein are applicable to systematically propagating changes of multiple managed storage systems in synchrony from a single source system to plural target systems, or from plural source systems to a single or plural target systems.

As shown, the source system 12 includes a source file system 16 with file transfer mechanism 18. In one non-limiting example, the file transfer mechanism 18 is a file transfer protocol (FTP) mechanism. Further, the source system 12 includes a source database management system (DBMS) 20. In one non-limiting example, the source DBMS 20 is a DB2 system having the above-referenced "DataLinks" management software incorporated therein, as modified by the present disclosure. Accordingly, the DBMS 20 includes metadata pertaining to files in the file system 16 for management thereof. Alternatively, the DBMS can be other types of DBMS which have DataLinks management software.

In the preferred embodiment, the source DBMS 20 includes, among other things, a data capture module 22 which, in one non-limiting example, is an enhanced DPropR "Capture" module disclosed in U.S. Pat. No. 5,613,113, incorporated herein by reference, that accesses a database change log 24. As disclosed in further detail below, the data capture module 22 can write data to a change data table 26 in the source DBMS 20. The source DBMS 20 also includes a source table 28 that includes metadata pertaining to source files.

By "file reference" is meant a database reference to a file in the associated file system, in the case of the source system 12, a file in the source file system 16. A file reference preferably includes but is not limited to two elements. The first is the name of the file server storing the file, and the second element is the name of the path to the file. For instance, a file reference, also referred to as a "link", might be "HTTP://FS1.ALMADEN.IBM.COM/data/images/proj1/file.avi", in which case the file server name would be "HTTP://FS1.ALMADEN.IBM.COM" and the file pathname would be "/data/images/proj1/file.avi."

Additionally, the target system 14 includes a target file system 30 with file transfer mechanism 32. In one non-limiting example, the file transfer mechanism 32 is a file transfer protocol (FTP) mechanism. Further, the target system 14 includes a target database management system (DBMS) 34. In one non-limiting example, the target DBMS 34 is a DB2 system having the above-referenced "DataLinks" management software incorporated therein, as modified by the present disclosure. Accordingly, the DBMS 34 includes metadata pertaining to files in the file system 30 for management thereof. Less preferably, the target need not be a DBMS, but rather can be, e.g., a LOTUS1-2-3 program running on a laptop computer, or even a personal digital assistant (PDA).

The target DBMS 34 includes, among other things, a data propagation module 36 which, in one non-limiting example, is an enhanced DPropR "Apply" module that can temporarily store data in a spill file 38. The basic DPropR "Apply" module is disclosed in U.S. Pat. No. 5,440,735, incorporated herein by reference. As disclosed in further detail below, the data propagation module 36 can write data to a target table 40 that includes data pertaining to target file references. Further, the data propagation module 36 can write data to an input file 42 that is associated with a user program 44 that functions in accordance with disclosure below to propagate files from the source file system 16 to the target file system 30. The user program also performs file reference mapping from the source system to the target system and records the mapped target file references in a result file 46 that is accessible to the data propagation module 36.

Having described the overall architecture of the system 10, it is to be understood that the various file systems, DBMS, and user programs can reside on one or more computers. As intended herein, one or more of the computers can be a server computer made by International Business Machines Corporation (IBM) of Armonk, N.Y. Other digital processors, however, may be used, such as personal computers, laptop computers, mainframe computers, palmtop computers, personal assistants, or any other suitable processing apparatus can be used.

In any case, the processor of each computer accesses the appropriate modules and programs to undertake the logic of the present invention, which may be executed by a processor as a series of computer-executable instructions. The instructions may be contained on a data storage device with a computer readable medium, such as a computer diskette having a computer usable medium with computer readable code elements stored thereon. Or, the instructions may be stored on random access memory (RAM) of the computer, on a DASD array, or on magnetic tape, conventional hard disk drive, electronic read-only memory, optical storage device, or other appropriate data storage device. In an illustrative embodiment of the invention, the computer-executable instructions may be lines of JAVA code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

Now referring to FIG. 2A, the overall logic of the present invention in the source system can be seen. Commencing at block 48, a file reference manipulation is received in the source DBMS 20 and is recorded in the log 24. Such a file reference manipulation can be caused by an SQL INSERT, DELETE, or UPDATE operation pursuant to file changes and other operations in the source file system 16 in accordance with DataLinks principles set forth in the above-referenced patent. At block 49, since the existing DataLinks triggers the archiving of a new copy of a file every time the file reference changes, a new copy of the file is archived at block 49. Preferably, the operation and row of data pertaining thereto are logged at block 50, along with the version number of the file. Moving to block 52, the log 24 is scanned by the data capture module 22, and the changes therein are recorded in the change data table 26, along with the version number.

FIG. 2B shows the logic of the target system. At decision diamond 54, it is determined whether the replication period has elapsed, i.e., whether reconciliation between the source and target systems 12, 14 is due. When it is time to replicate, the logic moves to block 56, wherein the data propagation module 36 of the target DBMS 34 retrieves data by accessing the change data table 26 for a differential refresh, used most of the time, or the source table 28 for a full refresh, used during initialization wherein all data in the source table is propagated to the target table. The data in the change data table 26 includes changes since the previous replication associated by version number. It can also include all previous changes if desired.

Once the target system 14 has retrieved the above-mentioned data from the source system 12, an empty spill file referred to herein as the "input" file 42 is created, and a DO loop is entered at block 58 for each file reference associated with an INSERT operation that has been performed pursuant to adding a new file to the source file system 16. Also, the DO loop is entered for each file reference associated with an UPDATE operation that has been performed pursuant to, e.g., changing a file in the source file system 16. It is to be understood that an UPDATE operation can be considered as a DELETE followed by an INSERT. The references are added to the input file 42.

The DO loop enters block 60 to invoke the user program 44 to map the file reference from the source DBMS 20 to the target DBMS 34 using the mapping tables shown in FIGS. 3 and 4. The details of this mapping will be discussed further below, but referring briefly to FIGS. 3 and 4 for an understanding of the structure of the presently preferred but non-limiting mapping tables, in FIG. 3 a server mapping table 62 is shown. The server mapping table 62 includes a server map identification column 64, a source file server name column 66, and a target file server name column 68. In the presently preferred implementation, the server map ID is a server mapping identifier which uniquely identifies a distinct source server to target server mapping, while the source and target server names are the names of a source file server and a corresponding target file server, respectively.

FIG. 4 on the other hand shows a file prefix mapping table 70 that, like the server mapping table 62, includes a server map identification column 72. However, unlike the server mapping table 62, the file prefix mapping table 70 includes a source prefix name column 74, and a target prefix name column 76. The source prefix name is the name of a valid file prefix in the source file system 16, such as "/data/images". In contrast, the target prefix name is the name of a valid file prefix in the target file system 30 to which the source prefix name is mapped, such as "/doc/data". The mapped file reference is stored in the result file 46.

Returning to FIG. 2B, after mapping the original file reference the present logic as might be embodied in the user program 44 moves to block 78, wherein at least changed file content is retrieved from the server specified in the file reference and then stored in the target system 14, where the file reference comes from the input file 42, as provided by the propagation module 36. The present invention intends that only the file having the latest version in the current cycle is retrieved for storage at block 78, such that only the latest version that is consistent with the metadata being replicated ("the latest consistent version") is replicated. The changed files (or at least changed portions thereof) can be transferred using FTP. In one preferred embodiment, if a target file already exists for a file being replicated, the newer version is copied using another name, and then when the above-described Apply process propagates the new references to the target at block 82, and then renames the newer version to have the same name the older version had. In this way, if the transaction crashes it can be aborted/rolled back and the file will be reverted to the original copy. Further details of a preferred implementation of this process is discussed further below in reference to FIG. 6.

At block 80, a DO loop is entered upon completion of copying all file changes from the source file system 16 to the target file system 30. Proceeding to block 82, the mapped file reference (instead of the original file reference of the source system 12) is propagated by the propagation module 36 to the target table 40, using the mapping tables shown in FIGS. 3 and 4.

Figure 5:
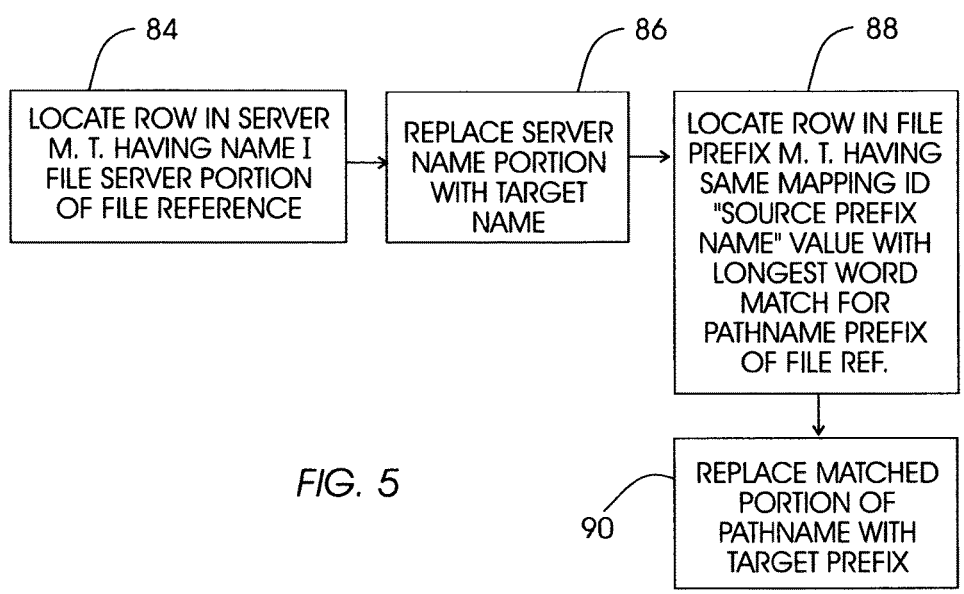
FIG. 5 is a flow chart showing the detailed logic of mapping a file reference from the source to the target.

FIG. 5 shows the details of mapping a file reference from the source DBMS 20 to the target DBMS 34. Commencing at block 84, a row is located in the server mapping table 62 that has a value in the server name column 66 that is equal to the file server portion of the file reference. Moving to block 86, the file server portion of the file reference is replaced with the value in the row's target name column 68. Next moving to block 88, a row is located in the file prefix mapping table 70 (FIG. 4) that has a value in the map ID column 72 that equals the value in the map ID column 64 of the row in the server mapping table 62 that was located at block 84. Also, the row selected at block 88 has the longest word match for the path name prefix of the file reference. At block 90, the matched portion of the pathname in the file reference is replaced with the value of the target prefix name column 76 in the row located at block 88 and then applied to the appropriate metadata row in the target DBMS 34, thereby mapping the file reference from the source system to the target system. If no match is found, the original prefix is used.

Figure 6:
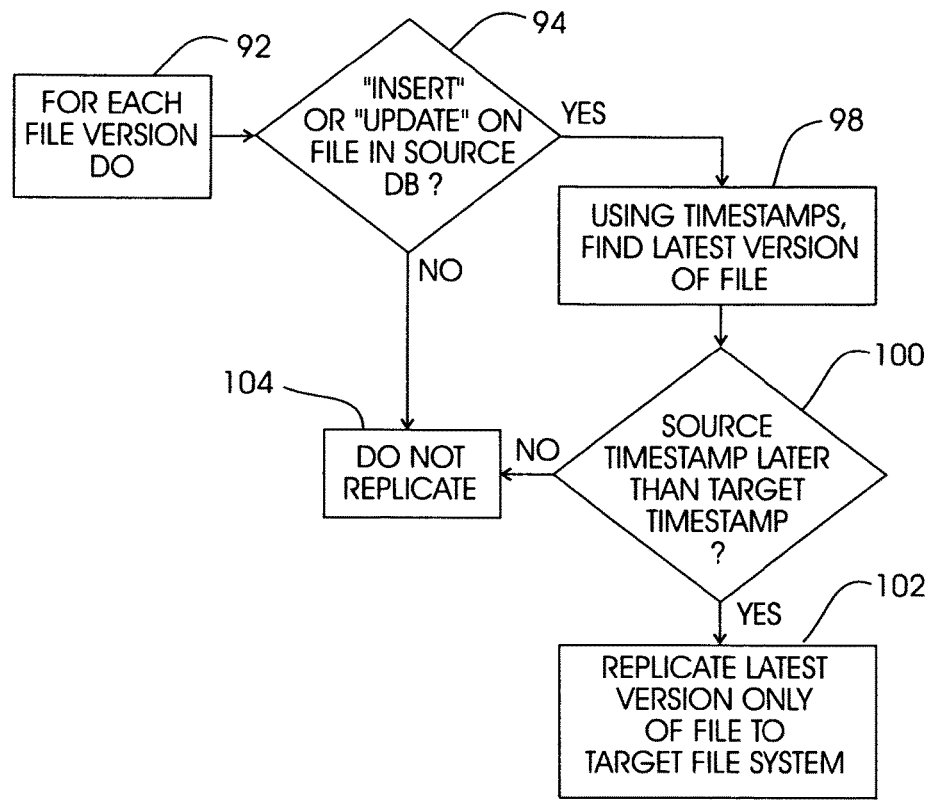
FIG. 6 is a flow chart showing the application logic for replicating a file to the target file system, while minimizing unnecessary copying.

Now referring to FIG. 6, the logic of the user program 44 in replicating files without unnecessary copying is shown. Commencing at block 92, for each version of a file contained in the input file 42, a DO loop is entered. Decision diamond 94 essentially represents the logic that unless an INSERT or UPDATE operation has been performed on the file reference of the file in the source DBMS 20, and the file itself has been changed, the file is not replicated.

If an INSERT or UPDATE operation has been performed on the reference to a file, and if the file itself has changed, the logic moves to block 98 to find the latest consistent version of the file in the input file 42, using file timestamps. If a file itself was changed as determined based on file modification timestamps, the logic at block 98 copies to the target file system only the latest consistent version of the file which is currently resided in the source file system, and which is archived in the early stage as described at block 49.

Proceeding to decision diamond 100, in a non-limiting embodiment it is determined whether the timestamp of the latest consistent version of the changed source file is later than the timestamp of the version of the file that is resident in the target file system 30. As intended herein, the timestamp of the file in the target system is the timestamp of the original source file that was copied over, which timestamp preferably is recorded in the target system for use in the comparison at decision diamond 100. Less preferably, a file system API can be invoked to change the timestamp of the target file to be equal to the timestamp of the original source file. Of course, for a new file the test at decision diamond 100 will be positive.

When the timestamp of the source version is later than that of the target version, indicating that the source file had been changed since the latest copy, the logic replicates the latest consistent version of the file to the target file system 30 at block 102. Otherwise, the file is not replicated, as represented by block 104.

It may now be appreciated that owing to the above-described synchronized replication of files between file systems and file references/metadata in the underlying DBMS, both data in the DBMS and data in the file systems are in a consistent state after replication. Moreover, the native interfaces for accessing the data at the various source and target sites is maintained.

Figure 7:
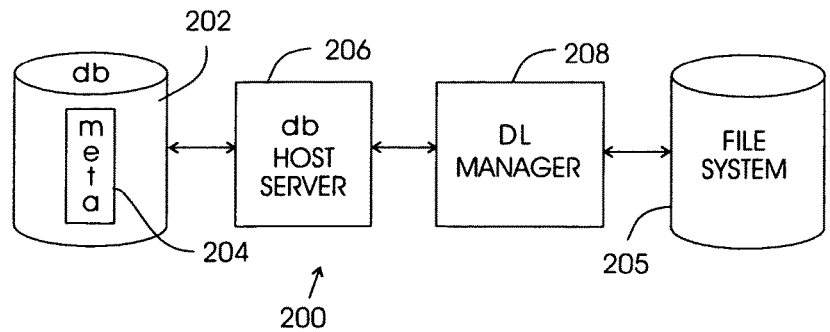
FIG. 7 is a simplified architectural diagram of the present system for updating files in a file system that is linked to a host database containing tables of metadata pertaining to the files in the file system.
Figure 8:
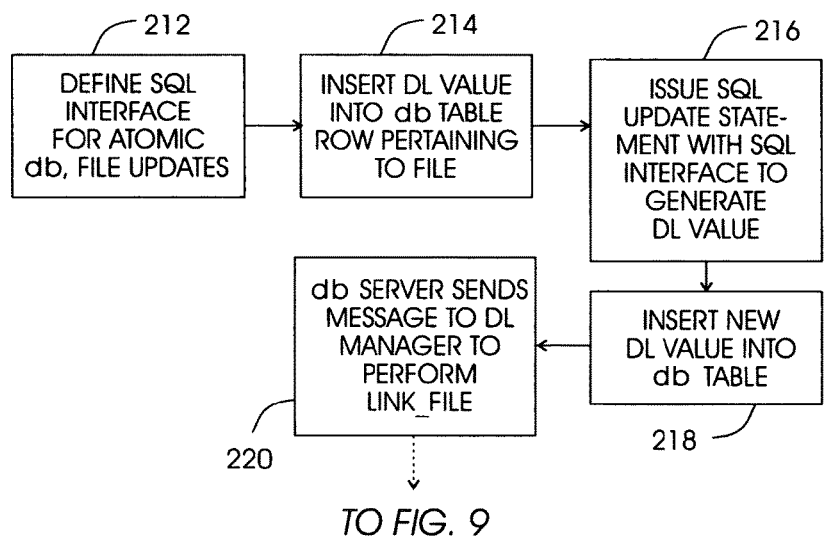
FIG. 8 is a flow chart showing the logic of SQL operations in the file update process.

FIGS. 7-9 illustrate a system and method for ensuring that the state of a file system is consistent with the state of a database that stores metadata pertaining to the file system. As shown in FIG. 7, a system 200 can include a database 202 such as a relational database that has one or more data structures 204 such as tables for storing, among other things, metadata pertaining to files in a file system 205. The system 200 can include a database host server 206 that controls the database 202 and a hardware- or software-implemented datalinks (DL) manager 208 that communicates with the server 206 and with the file system 205.

The system 200 operates in accordance with the logic shown in FIGS. 8 and 9. The system 200 can be used, among other things, to replicate updates of files in the file system 205 that are linked to the database 202. Also, the system 200 can be used by Java applications to manage semi-structured and unstructured data. The system 200 is useful in collaborative computing, such as GRID computing, to facilitate the sharing of information using the database 202 and file system 205. As can be appreciated from the following disclosure, the system 200 provides an SQL interface to perform database data and file system updates in an atomic manner. Stated differently, the system 200 ensures that files in the file system 205 and referenced by the database are not updated except when a transaction reflecting corresponding changes in the metadata commits in the database system 202.

An SQL interface is defined to facilitate the above-mentioned updates. Although not part of the operational flow, this step is represented for disclosure purposes as block 212 in FIG. 8. The interface can be embodied in software that is contained in any appropriate program storage device, e.g., hard disk drive, solid state memory, EEPROM, RAM, ROM, etc.

The preferred interface, which can be referred to as "DLREPLACECONTENT", indicates both the original file in the file system 205 and its replacement file that are to participate in a database transaction. In one non-limiting example, the SQL interface is a database scalar function of the form:

```
|--DLREPLACECONTENT -- ( -- data-location-target --, ------->
>------------------------data-location-source------------>
>-------------------------------------------------- ) ---|
|-- , -- comment-string ------------------------|
```

In the above, data-location-target is a VARCHAR expression that specifies the data location of the original file in URL format, and data-location-source is a VARCHAR expression that specifies the data location of the replacement file in URL format. "Comment string" is an optional VARCHAR expression that provides a comment or additional location information.

As set forth in greater detail below, the DLREPLACECONTENT function returns a value, referred to herein as a "DATALINK" ("DL") value. When the function is on the right hand side of a SET clause in an UPDATE statement or is in a VALUES clause of an INSERT statement, the assignment of the value results in replacing the content of the original file with the content of the replacement file in the file system 205, and then linking the now-updated file to the corresponding metadata in the database 202 during the commit processing of the transaction.

Block 214 indicates that a DATALINK value is inserted into the metadata table row pertaining to a file using, e.g., the following SQL INSERT statement:

```
EXEC SQL INSERT INTO TBLA (PICT_ID, PICT_FILE)
VALUES (1000,
    DLVALUE('HTTP://HOSTA.COM/dlfS/image-data/pict1.gif'));
```

In the above INSERT statement, the metadata table is "TBLA" and the DLVALUE is inserted into the PICT_FILE column of row PICT_ID=1000.

When the underlying original file in the file system 205 is to be updated, a user would make the desired modifications which are saved in a replacement file located at the address HTTP://HOSTA.COM/dlfs/image-data/pict1.gif.new. Prior to performing this update, a DATALINK value is assumed to exist in the table by operation the above-mentioned INSERT operation, otherwise users can invoke SQL UPDATE to insert a DATALINK value. The changes are not made to the original file, however, until a database transaction has committed under the following logic. At block 216, an SQL UPDATE statement is issued that contains the SQL interface and that returns a new DATALINK value as follows:

```
EXEC SQL UPDATE TBLA
SET PICT_FILE =
    DLREPLACECONTENT ('HTTP://HOSTA.COM/dlfs/image-data/pict1.gif',
        'HTTP://HOSTA.COM/dlfS/image-data/pict1.gif.new'
)
WHERE PICT_ID = 1000;
```

The new DATALINK value is inserted into the metadata table ("TBLA") at block 218. At block 220, the server 206 sends a message to the DL manager 208 to execute the logic shown in FIG. 9, referred to herein as "UPDATE_FILE".

Accordingly, now referring to FIG. 9, at block 222 the DL manager validates the existence of the original and replacement files. It also extracts certain attributes from the files, including last modification time, file size, and, for UNIX the file inode number. At the end of this step, an implicit lock is on the file, so that no one except a "super-user" can delete or change the file. The lock is released after the below-described commit processing is completed.

Moving to block 224, the extracted attributes are logged in a metadata repository that is associated with the DL manager 208. If the file is not present, an error message is returned.

Block 226 indicates that the ensuing two-phase commit logic is undertaken only when the transaction is instigated by the user by issuing a commit request for the transaction containing an UPDATE statement. At block 228 the database server 206 commands the DL manager 208 to make the logged operations from block 224 persistent. If it is determined at decision diamond 230 that the command at block 228 was not successfully executed, the transaction aborts at state 232 and participants are ordered to roll back their various transactions. Otherwise, the logic enters a second phase of the commit process. After it is confirmed that the above-described first phase of the commit has been successful, a second phase commit message is sent and at block 234 the DL manager 208 confirms that no changes to the original and replacement files have been made since the logging operation of block 224 by comparing the logged attributes with the current file attributes. If any changes have been made, an error message is generated.

Assuming that no changes have been made, the logic proceeds to block 236 to retrieve the security attributes of the original file (e.g., the owner of the file and the access control list of the file) and to set the security attributes to the replacement file. Accordingly, after the operation at block 236 the security attributes of the replacement file are identical to those of the original file. The original file is then removed from the file system 205.

Completing the logic at block 238, the replacement file is renamed by giving it the name of the original file. In the above-disclosed example, for instance. "HOSTA.COM/dlfs/image-data/pict1.gif.new" becomes "HTTP://HOSTA. COM/dlfs/image-data/pict1.gif". The above-mentioned implicit lock is then released.

In the case of DLREPLACEMENTCONTENT, the file is not archived until the end of the above-described two-phase commit process. Otherwise, the file being archived would be the original version, not the new version, since the name change only occurs at block 238. Accordingly, after the renaming phase of block 238, the file is archived.

As mentioned above, if, during the first phase of the commit, a system crash, for example, occurs, the operation aborts. If a system crash occurs during the second phase, blocks 234-238 are re-executed. Recall that the file attributes are copied from the original file to the replacement file, the original file is then deleted, and the renaming operation executed. This makes the operation idempotent. Accordingly, after the system is restarted following a second phase crash, if the replacement file is no longer present but the original file remains with the same timestamp and file size as the replacement file, "OK" is returned. Otherwise, an error message is generated to alert the user to take corrective action. On the other hand, if the replacement file remains after the crash (and is the same file as indicated by having the same file size and timestamp as before the crash), the file attributes (recorded at block 224) are copied from the original file to the replacement file, and the renaming operation is executed, skipping the deletion of the original file.

With the above disclosure in mind, it is to be appreciated that while in the preferred embodiment the metadata and underlying file are changed during a single database transaction, this is accomplished without requiring the user to go through the database server 206 to store and retrieve file content. Rather, the user advantageously manipulates the files directly on the file system in the preferred embodiment discussed above, despite the files being advantageously managed as though they are in the database.

While the particular SYSTEM AND METHOD FOR UPDATING EXTERNAL FILE REFERENCED BY DATABASE WITH TRANSACTIONAL CONSISTENCY USING SQL as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. § 112, sixth paragraph, unless the element is expressly recited using the phrase "means for".

We claim:

1. A computer program product comprising:
    means for writing at least changes to at least one original file stored in a file system and having a name to at least one replacement file, the original file having metadata stored in a database system;
means for commencing a database transaction in the database system;
means for, responsive to a determination that the transaction commits,
designating, as the name of the replacement file, the name of the original file; and
removing the original file from the file system;
the designating means not designating, as the name of the replacement file, the name of the original file responsive to a determination that the transaction does not commit.

2. The computer program product of claim 1, wherein responsive to a determination that the transaction does not commit, the original file is not removed from the file system.

3. The computer program product of claim 1, further comprising means for setting, responsive to a determination that the transaction commits, at least one security attribute of the original file as a security attribute of the replacement file.

4. The computer program product of claim 1, comprising means for providing at least one SQL interface to facilitate at least the designating and removing means.

5. The computer program product of claim 1, comprising means for providing at least one SQL interface executable in at least one of an SQL UPDATE statement, and an SQL INSERT statement, the SQL interface providing at least one value to the database system.

6. The computer program product of claim 5, comprising means for inserting the value into at least one data structure in the database system representing the metadata.

7. The computer program product of claim 6, comprising means for sending a message from the database system to at least one manager associated with the file system to execute at least the designating means after operation of the means for inserting.

8. The computer program product of claim 7, comprising means for validating the existence of the original and replacement files in response to the message.

9. The computer program product of claim 7, comprising means for extracting security attributes from the original file in response to the message.

10. The computer program product of claim 9, comprising means responsive to the server for making logged operations pertaining to the original and replacement files persistent.

11. The computer program product of claim 10, comprising means for determining whether the means for making persistent is successful, and responsive to a determination that the means for making persistent is successful, undertaking at least one of: setting at least one security attribute of the replacement file to be a security attribute of the original file, and renaming the replacement file.

12. The computer program product of claim 7, wherein the manager obtains an implicit lock on the original file, so that no one except a "super-user" can delete or change the original file.

13. The computer program product of claim 11, comprising means for archiving the replacement file only after the replacement file has been renamed pursuant to a DLREPLACEMENTCONTENT operation.

14. The computer program product of claim 1, wherein the designating and removing means establish at least in part a second phase of a commit, and responsive to a determination that a system crash occurs during the second phase, the product includes means for reexecuting at least the designating and removing means to restart the system.

15. The computer program product of claim 14, further comprising:
means for, responsive to a determination that the replacement file is no longer present after the restart but the original file remains with a same timestamp and file size as the replacement file, returning "OK", otherwise generating an error message; and
means for, responsive to a determination that the replacement file remains after the crash, copying file attributes from the original file to the replacement file, and renaming the replacement file but not deleting the original file.

16. A computer-implemented method for ensuring consistency between metadata stored in a database system and files stored in a file system and represented by the metadata, comprising:
writing at least changes to at least one original file having a name to at least one replacement file;
commencing a database transaction;
determining whether the transaction commits,
responsive to a determination that the transaction commits, designating, as the name of the replacement file, the name of the original file and
removing the original file from the file system;
responsive to a determination that the transaction does not commit, not designating, as the name of the replacement file, the name of the original file, wherein at least one manager is associated with the file system, the at least one manager receiving at least one message from the database system to execute at least the designating and removing, the manager also extracting security attributes from the original file in response to the message.

17. The method of claim 16, wherein when the transaction does not commit, the original file is not removed from the file system.

18. The method of claim 16, further comprising, responsive to a determination that the transaction commits, setting at least one security attribute of the original file as a security attribute of the replacement file.

19. The method of claim 16, comprising providing at least one SQL interface to facilitate at least the designating and removing acts.

20. The method of claim 16, comprising providing at least one SQL interface executable in at least one of: an SQL UPDATE statement, and an SQL INSERT statement, the SQL interface providing at least one value.

21. The method of claim 20, comprising inserting the value into at least one data structure in the database system representing the metadata.

22. The method of claim 21, wherein at least one server associated with the database system sends the at least one message to the at least one manager associated with the file system to execute at least the designating and removing acts after the act of inserting the value into the data structure.

23. The method of claim 22, wherein the manager validates the existence of the original and replacement files in response to the message.

24. The method of claim 22, wherein the manager, responsive to the server, makes logged operations pertaining to the original and replacement files persistent.

25. The method of claim 24, wherein the manager determines whether the act of making persistent is successful, and if so, undertakes at least one of: setting at least one security attribute of the replacement file to be a security attribute of the original file, and executing the designating act.

26. A system comprising:
at least one database system storing metadata;
at least one file system storing files represented by the metadata; and
at least one SQL interface ensuring that files in the file system are not updated except when a transaction reflecting corresponding changes in the metadata commits in the database system;
at least one processor accessing instructions on a computer memory, the instructions when executed by the processor configuring the processor for:
determining whether the transaction commits;
responsive to a determination that the transaction commits, setting at least one security attribute of an original file as a security attribute of a replacement file.

27. The system of claim 26, wherein the SQL interface is executable in at least one of: an SQL UPDATE statement, and an SQL INSERT statement, the SQL interface providing at least one value to the database system.

28. The system of claim 26, comprising at least one server associated with the database system sending at least one message to at least one manager associated with the file system to designate, as the name of a replacement file, a name of an original file, and to remove the original file from the file system after the act of providing the value to the database system.

29. The system of claim 28, wherein the manager validates the existence of the original and replacement files in response to the message.

30. The system of claim 28, wherein the manager extracts security attributes from the original file in response to the message.

31. The system of claim 28, wherein the manager, responsive to the server, makes logged operations pertaining to the original and replacement files persistent.

32. The system of claim 31, wherein the manager determines whether the act of making persistent is successful, and responsive to a determination that the act of making persistent is successful undertakes at least one of: setting at least one security attribute of the replacement file to be a security attribute of the original file, and renaming the replacement file to have the name of the original file.

33. A system for maintaining metadata in a database system consistent with file data in a file system including at least one manager, the file data being represented by the metadata, the system comprising:
at least one SQL interface on a non-transitory computer readable medium facilitating metadata and file updates in an atomic manner, at least one processor being configured to access computer instructions on the medium which instructions when executed by the processor configure the processor to ensure that files in the file system and referenced by the database system are not updated except responsive to a determination that a transaction reflecting corresponding changes in the metadata is determined to have committed in the database system, wherein the manager is configured to, responsive to the database system, make logged operations pertaining to an original file having a replacement file persistent, wherein the manager is further configured to determine whether the make persistent is successful, and responsive to a determination that the make persistent is successful undertake at least one of: setting at least one security attribute of the replacement file to be a security attribute of the original file, renaming the replacement file to have the name of the original file.

34. The system of claim 33, wherein the instructions when executed by the processor configure the processor to ensure that files in the file system are not updated except responsive to a determination that a transaction reflecting corresponding changes in the metadata commits in the database system.

35. The system of claim 34, wherein the instructions when executed by the processor configure the processor to determine whether the transaction commits, and responsive to a determination that the transaction commits, setting at least one security attribute of the original file as a security attribute of the replacement file corresponding to the original file.

36. The system of claim 34, wherein the SQL interface is executable in at least one of: an SQL UPDATE statement, and an SQL INSERT statement, the SQL interface providing at least one value to the database system.

37. The system of claim 34, comprising at least one server associated with the database system for sending at least one message to the at least one manager associated with the file system to designate, as the name of a replacement file, a name of an original file, and to remove the original file from the file system after the act of providing the value to the database system.

38. The system of claim 37, wherein the manager is configured to validate the existence of the original and replacement files in response to the message.

39. The system of claim 37, wherein the manager is configured to extract security attributes from the original file in response to the message.

40. The method of claim 22, wherein the manager is configured to obtain an implicit lock on the original file, so that no one except a "super-user" can delete or change the original file.

41. The system of claim 28, wherein the manager is configured to obtain an implicit lock on the original file, so that no one except a "super-user" can delete or change the original file.

42. The system of claim 37, wherein the manager is configured to obtain an implicit lock on the original file, so that no one except a "super-user" can delete or change the original file.

43. The method of claim 16, wherein the replacement file is renamed, and wherein after a DLREPLACEMENTCONTENT operation, the replacement file is not archived until it has been renamed.

44. The system of claim 26, wherein after a DLREPLACEMENTCONTENT operation, the replacement file is not archived until it has been renamed.

45. The system of claim 33, wherein after a DLREPLACEMENTCONTENT operation, the replacement file is not archived until it has been renamed.

46. The method of claim 16, wherein the designating and removing acts establish at least in part a second phase of a commit, and responsive to a determination that a system crash occurs during the second phase, the method includes reexecuting at least the designating and removing acts to restart the system.

47. The method of claim 46, wherein after the restart the method includes:
responsive to a determination that the replacement file is no longer present but the original file remains with a same timestamp and file size as the replacement file, returning "OK", otherwise generating an error message;
responsive to a determination that the replacement file remains after the crash, copying file attributes from the original file to the replacement file, and renaming the replacement file but not deleting the original file.

48. The system of claim 28, wherein the designating and removing acts establish at least in part a second phase of a commit, and responsive to a determination that a system crash occurs during the second phase, the manager reexecutes at least the designating and removing acts to restart the system.

49. The system of claim 48, wherein after the restart the manager undertakes logic comprising:
responsive to a determination that the replacement file is no longer present but the original file remains with a same timestamp and file size as the replacement file, returning "OK", otherwise generating an error message;
responsive to a determination that the replacement file remains after the crash, copying file attributes from the original file to the replacement file, and renaming the replacement file but not deleting the original file.

50. The system of claim 37, wherein the designating and removing acts undertaken by the manager establish at least in part a second phase of a commit, and responsive to a determination that a system crash occurs during the second phase, the manager reexecutes at least the designating and removing acts to restart the system.

51. The system of claim 50, wherein after the restart the manager is configured to undertake logic comprising:
responsive to a determination that the replacement file is no longer present but the original file remains with a same timestamp and file size as the replacement file, returning "OK", otherwise generating an error message;
responsive to a determination that the replacement file remains after the crash, copying file attributes from the original file to the replacement file, and renaming the replacement file but not deleting the original file.

52. A device comprising:
at least one non-transitory computer memory accessible having instructions which when executed by at least one computer processor configure the at least one computer processor for:
writing at least changes to at least one original file stored in a file system and having a name to at least one replacement file, the original file having metadata stored in a database system;
commencing a database transaction in the database system;
responsive to a determination that the transaction commits,
designating, as the name of the replacement file, the name of the original file; and
removing the original file from the file system;
not designating, as the name of the replacement file, the name of the original file responsive to a determination that the transaction does not commit, wherein the instructions when executed by the processor configure the processor for establishing at least in part a second phase of a commit, and wherein the instructions when executed by the processor configure the processor for, responsive to a determination that a system crash occurs during the second phase, reexecuting at least the designating and removing acts to restart the system.

53. The device of claim 52, wherein the instructions when executed by the processor configure the processor for, responsive to determining that the transaction does not commit, not removing the original file from the file system.

54. The device of claim 52, wherein the instructions when executed by the processor configure the processor for setting, responsive to a determination that the transaction commits, at least one security attribute of the original file as a security attribute of the replacement file.

55. The device of claim 52, wherein the instructions when executed by the processor configure the processor for providing at least one SQL interface to facilitate at least the designating and removing acts.

56. The device of claim 52, wherein the instructions when executed by the processor configure the processor for providing at least one SQL interface executable in at least one of: an SQL UPDATE statement, and an SQL INSERT statement, the SQL interface providing at least one value to the database system.

57. The device of claim 56, wherein the instructions when executed by the processor configure the processor for inserting the value into at least one data structure in the database system representing the metadata.

58. The device of claim 57, wherein the instructions when executed by the processor configure the processor for sending a message from the database system to at least one manager associated with the file system to execute at least the designating means after operation of the means for inserting.

59. The device of claim 58, wherein the instructions when executed by the processor configure the processor for validating the existence of the original and replacement files in response to the message.

60. The device of claim 58, wherein the instructions when executed by the processor configure the processor for extracting security attributes from the original file in response to the message.

61. The device of claim 60, wherein the instructions when executed by the processor configure the processor to be responsive to the server for making logged operations pertaining to the original and replacement files persistent.

62. The device of claim 61, wherein the instructions when executed by the processor configure the processor for determining whether logged operations pertaining to the original and replacement files are made persistent, and responsive to determining that logged operations pertaining to the original and replacement files are made persistent, setting at least one security attribute of the replacement file to be a security attribute of the original file.

63. The device of claim 61, wherein the instructions when executed by the processor configure the processor for determining whether logged operations pertaining to the original and replacement files are made persistent, and responsive to determining that logged operations pertaining to the original and replacement files are made persistent, renaming the replacement file.

64. The device of claim 58, wherein the manager obtains an implicit lock on the original file, so that no one except a "super-user" can delete or change the original file.

65. The device of claim 52, wherein the instructions when executed by the processor configure the processor for archiving the replacement file only after the replacement file has been renamed pursuant to a DLREPLACEMENTCONTENT operation.

66. The device of claim 52, wherein the instructions when executed by the processor configure the processor for, responsive to a determination that the replacement file is no longer present after the restart but the original file remains with a same timestamp and file size as the replacement file, returning "OK", otherwise generating an error message, wherein the instructions when executed by the processor configure the processor for, responsive to a determination that the replacement file remains after the crash, copying file attributes from the original file to the replacement file, and renaming the replacement file but not deleting the original file.

* * * * *

UNITED STATES PATENT AND TRADEMARK OFFICE
CERTIFICATE OF CORRECTION

PATENT NO. : 10,235,368 B2
APPLICATION NO. : 10/135982
DATED : March 19, 2019
INVENTOR(S) : Hsiao et al.

Page 1 of 1

It is certified that error appears in the above-identified patent and that said Letters Patent is hereby corrected as shown below:

On the Title Page

Under (*) Notice, Lines 4-5 delete the sentence that reads:
"This patent is subject to a terminal disclaimer."

Item (45), delete the "*"

Signed and Sealed this
Twenty-third Day of April, 2019

Andrei Iancu
*Director of the United States Patent and Trademark Office*